(12) United States Patent
Lampkin et al.

(10) Patent No.: US 10,530,721 B2
(45) Date of Patent: Jan. 7, 2020

(54) CUSTOMIZED TIMING FOR ACCESS TO SHARED MEDIA FILES

(71) Applicant: International Business Machines Corporation, Armonk, NY (US)

(72) Inventors: Valerie J. Lampkin, Woodstock, GA (US); Michael S. Thomason, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 199 days.

(21) Appl. No.: 14/949,910

(22) Filed: Nov. 24, 2015

(65) Prior Publication Data

US 2017/0149709 A1   May 25, 2017

(51) Int. Cl.
*G06F 15/16* (2006.01)
*H04L 12/58* (2006.01)
*G06N 20/00* (2019.01)

(52) U.S. Cl.
CPC ............ *H04L 51/10* (2013.01); *G06N 20/00* (2019.01); *H04L 51/32* (2013.01)

(58) Field of Classification Search
CPC .......... H04L 51/10; H04L 51/32; G06N 20/00
See application file for complete search history.

(56) References Cited

U.S. PATENT DOCUMENTS

| 8,959,148 | B2 | 2/2015 | Kothari et al. | |
|---|---|---|---|---|
| 2006/0149822 | A1* | 7/2006 | Henry | H04L 51/24 709/206 |
| 2008/0235083 | A2* | 9/2008 | Bosarge | G06Q 30/02 705/14.73 |
| 2009/0313346 | A1* | 12/2009 | Sood | G06Q 10/10 709/207 |

(Continued)

FOREIGN PATENT DOCUMENTS

AU    2014277772 A1    1/2015

OTHER PUBLICATIONS

NPL, Time to Live Wikipedia entry, Jan. 2013 (Year: 2013).*

(Continued)

*Primary Examiner* — Padma Mundur
(74) *Attorney, Agent, or Firm* — Cantor Colburn LLP; Michael O'Keefe

(57) ABSTRACT

An aspect of customized timing for access to shared media includes parsing a communication from a sender, and calculating, based on parsed elements of the communication, a personal score for the communication. The personal score indicates a degree to which information in the communication is determined to be of a personal nature. A further aspect includes calculating a relationship score reflecting a strength of a relationship between the sender and the recipient. The relationship score is calculated from previous communications conducted between the sender and the recipient. Another aspect includes selecting a timing value indicating a length of time the communication will be accessible to the (Continued)

recipient based on a combined respective personal score and relationship score, transmitting the communication to the recipient and monitoring the timing value, and limiting actions that can be taken on the communication by the recipient as a function of the timing value.

18 Claims, 3 Drawing Sheets

(56) References Cited

U.S. PATENT DOCUMENTS

| | | | | |
|---|---|---|---|---|
| 2010/0281543 | A1* | 11/2010 | Golomb | G06F 21/577 |
| | | | | 726/25 |
| 2012/0030157 | A1* | 2/2012 | Tsuchida | G06F 17/278 |
| | | | | 706/20 |
| 2013/0124644 | A1* | 5/2013 | Hunt | H04L 51/12 |
| | | | | 709/206 |
| 2014/0282096 | A1* | 9/2014 | Rubinstein | H04L 65/403 |
| | | | | 715/753 |
| 2015/0332313 | A1* | 11/2015 | Slotwiner | G06Q 30/0245 |
| | | | | 705/14.44 |
| 2016/0359778 | A1* | 12/2016 | Shi | H04L 51/046 |
| 2017/0039204 | A1* | 2/2017 | Blanchflower | G06Q 10/10 |

OTHER PUBLICATIONS

NPL, Microsoft Message Analyzer, Nov. 2013 (Year: 2013).*
IP.com, "Dynamic White Walling Social Network Activities Based on Recipient's Visual Literacy Index", IPCOM000239252D, Oct. 23, 2014, 5 pages.

* cited by examiner

US 10,530,721 B2

CUSTOMIZED TIMING FOR ACCESS TO SHARED MEDIA FILES

BACKGROUND

The invention relates generally to media sharing, and more specifically, to customized timing for access to shared media files.

When sharing media via social or collaborative programs (e.g., SNAPCHAT®), some files may be set with a destructive read feature that deletes the files according to a static timer. Correspondingly, a recipient is limited in the ability to access files based on the timer.

SUMMARY

According to an embodiment a method, system, and computer program product for customized timing for access to shared media files are provided. A method includes parsing a communication from a sender. The communication is addressable to a recipient. The method also includes calculating, based on parsed elements of the communication, a personal score for the communication. The personal score indicates a degree to which information in the communication is determined to be of a personal nature. The method further includes calculating a relationship score reflecting a strength of a relationship between the sender and the recipient. The relationship score is calculated from previous communications conducted between the sender and the recipient. The method also includes selecting a timing value indicating a length of time the communication will be accessible to the recipient based on a combined respective personal score and relationship score, transmitting the communication to the recipient and monitoring the timing value, and limiting actions that can be taken on the communication by the recipient as a function of the timing value.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide customized timing for access to shared media files. The customized timing features enable a variable length timer to be applied to a communication based on the strength of the sender's relationship to the recipient, as well as a degree to which the communication contains personal content. In an embodiment, the timing features prevent or minimize the time a media file is available to another a user for purposes of viewing, copying, or forwarding the file.

Figure 1:
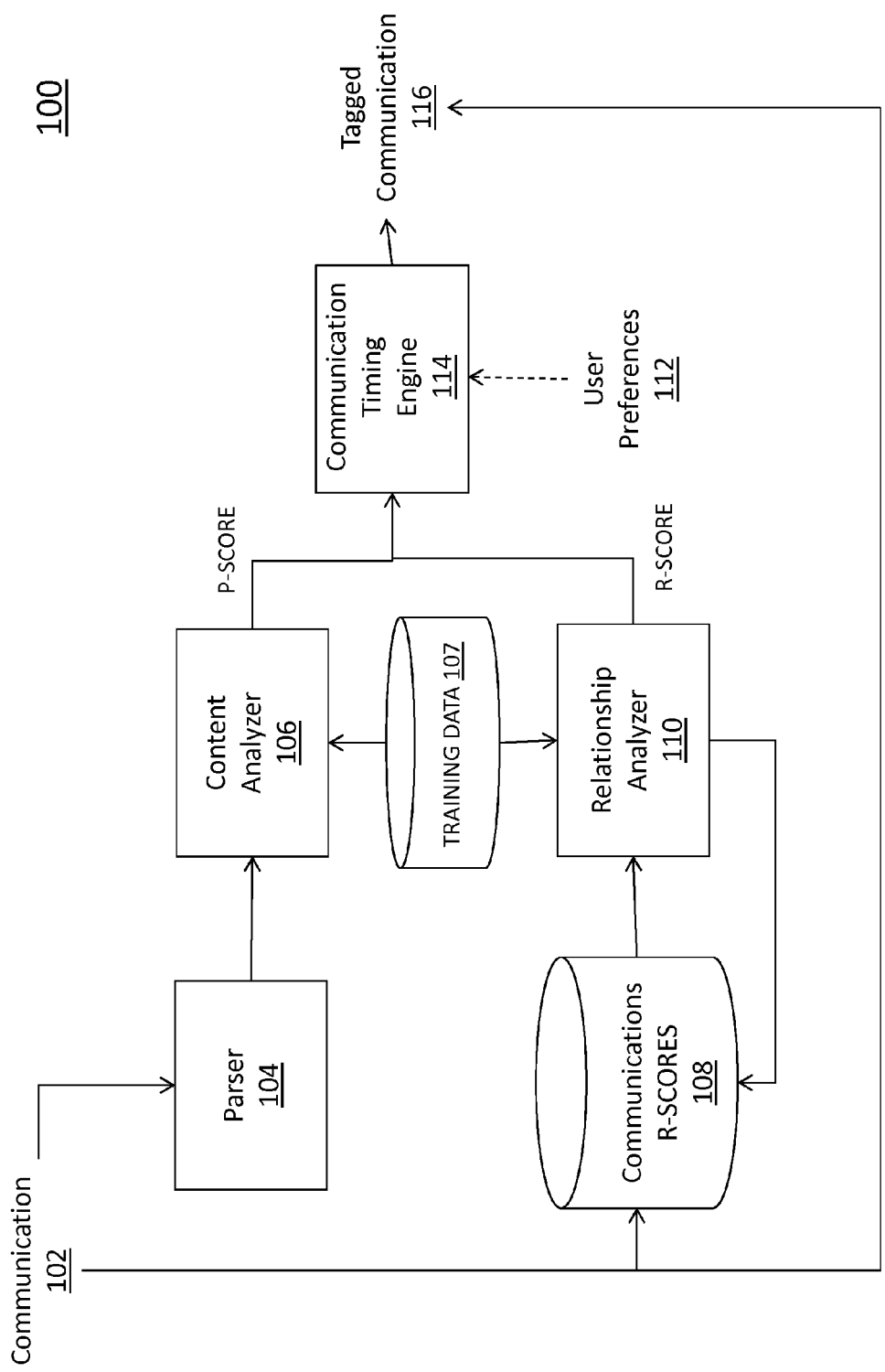
FIG. 1 depicts a block diagram of a component architecture upon which customized timing for access to shared media files may be implemented in accordance with an embodiment of the invention.

Turning now to FIG. 1, a component architecture 100 for implementing customized timing for access to shared media files will now be described in accordance with an embodiment.

The architecture 100 includes a parser 104, a content analyzer 106, and a database 107 of training data. The parser 104 parses a communication 102 into parsed, constituent elements for analysis. When a sender initiates a communication 102 (e.g., a post to a social network website, an email, video, or other communication that may be delivered with a timing feature), the communication is intercepted by or delivered to the parser 104. In an embodiment, the communication 102 is a media file. The communication includes an identity of the sender, and identity of the recipient, and associated content created or shared by the sender. The content may include text, images, and/or multi-media. The communication 102 may be non-personal or of a low personal nature, such as a general greeting to the recipient, or may contain highly personal subject matter, such as the user's home address, phone number, and birth date, to name a few. The degree to which any information is deemed to be of a personal nature may depend, in part, on any risk or emotional impact to the sender should the information be exposed to external entities, such as a public forum of individuals or to individuals having a limited relationship with the sender (e.g., co-workers).

In an embodiment, the recipient may include a plurality of individuals that share some form of relationship with the sender, e.g., ranging from a close family member to an individual that is unknown to the sender and who, e.g., 'follows' the sender but has no particular defined relationship with the sender outside of the network forum.

The content analyzer 106 calculates a personal score (P-score) that indicates a degree to which information in the communication is of a personal nature. In an embodiment, the parsed elements in the communication 102 are compared to elements in the training data database 107 and values associated with matching elements between the parsed elements and the training data are aggregated to form the personal score. Values associated with each of the elements in the training data are assigned to the elements based on a degree to which the elements in the training data are predetermined to invoke an emotional response, and in particular, a negative emotional response. For example, if a sender generates a communication that conveys a high level of emotion (e.g., as determined by analysis of certain emotion-based key words, the use of exclamation points, capital letters, bolded or enlarged font, emoticons associated with negative emotions, etc.), and the subject matter of the communication corresponds to a close relative or friend, the emotional response with respect to the sender may be high. In this scenario, it may not be beneficial for the communication to remain indefinitely accessible to all recipients of the communication. Thus, certain emotion-driven elements may be assigned different values based on a degree of emotional response or impact.

Also included in the architecture 100 is a database 108 that stores communications posted by individuals over a collaborative network website, as well as relationship scores (R-scores) and a relationship analyzer 110. In an embodiment, the individuals have joined or registered for access to the network website. The communications between a particular sender and corresponding recipients are collected by the network website and accessed by the relationship analyzer 110 to calculate a relationship score between the sender of communications (e.g., via posting to the network website) and recipients of these communications. In an embodiment, if a relationship score has already been calculated for the sender/recipient relationship, the relationship analyzer 110 may simply use the relationship score on file. In an embodiment, the relationship analyzer 110 updates the relationship score as new communications are collected in the database 108.

In an embodiment, the relationship analyzer 110 calculates the relationship score from training data in the database 107. The training data includes predefined criteria for quantifying a relationship score. In an embodiment, the relationship score may account for a frequency of communications conducted between the sender and the recipient, a proximity of the communications to one another in time, an identified relationship type (e.g., the sender identifies himself as being married to a particular recipient, and this status is saved by the media network system). Relationship types can be familial, work-based, school-based, and/or based on a common community membership, to name a few. In an embodiment, the relationship score may also be calculated based on the personal scores calculated from previous communications between the sender and the recipient. For example, if the personal score of a percentage of communications exceeds an average predetermined value, then it may be ascertained that the sender has a close relationship with the recipient. It is understood that various weighting schemes can be applied, such that certain criteria used in the calculations can be given greater or lesser weight as desired.

The architecture 100 further includes a communication timing engine 114, optional user preferences 112, and a tagged communication 116. The communication timing engine 114 receives a combined personal score and relationship score and selects a timing value for association with the communication 102. The timing value selected is based on the combined scores. The timing engine 114 may access a predefined table of scores and assigned time values to determine what time value to assign to a particular combined P-score and R-score. For example, suppose user A has a relationship score of 90 with user B and a relationship score of 30 with user C based on past communication patterns. In this example, the higher the relationship score, the stronger the relationship, and the higher the personal score, the stronger the personal association. User A sends an image to users B and C. The system determines a personal score of the communication as being 20. The system retrieves the table and determines that user B should have unlimited access to the communication, while user C's access should be limited to 10 minutes. In another example, suppose user A has a relationship score of 90 with user B and relationship score of 30 with user C based on previous communications. User A sends a text to users B and C. The system determines the text contains negative comments about a close family member, and scores the text with a personal score of 100. The system sets the access time for user B to 10 minutes, and the access time for user C to 1 minute.

In an embodiment, the sender may input preferences 112 for influencing and/or overriding the timing value assigned by the system to the communication. For example, suppose the communication is assigned a personal score of 100. Since the relationship score of a recipient is also high, the system determines a timing value of 10 minutes. Because the personal score is so high, the system may prompt the sender to verify this timing value. The sender may accept the assigned timing value or override the value with another timing value that is selected by the sender.

Once the timing value is determined, the communication 102 is then tagged with the timing value.

Figure 2:
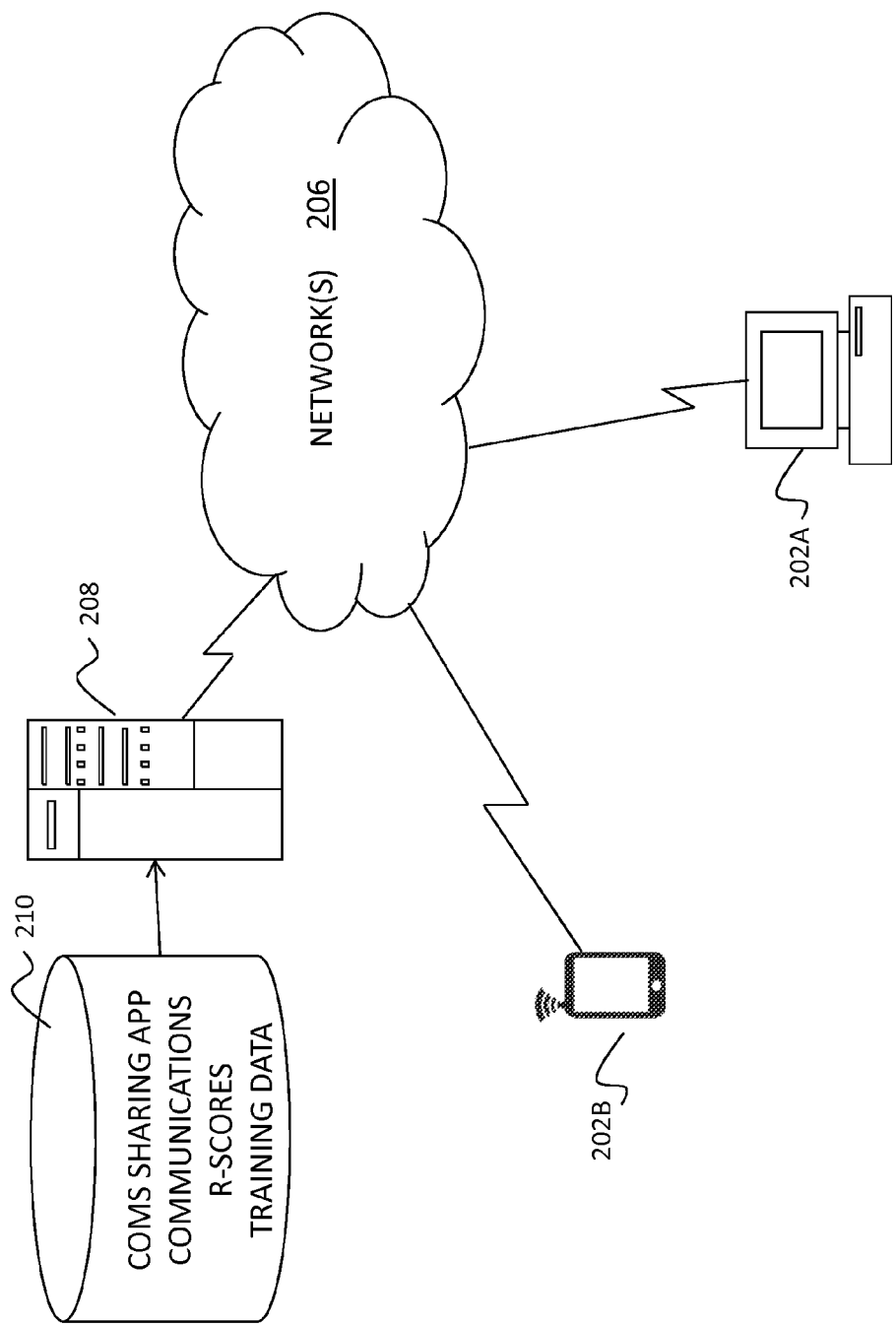
FIG. 2 depicts a block diagram of a system upon which customized timing for access to shared media files may be implemented in accordance with an embodiment of the invention.

Turning now to FIG. 2, a system 200 upon which the customized timing for access to shared media files may be implemented will now be described in one embodiment. The system 200 includes end user devices 202A and 202B and a host system computer 208, each of which is communicatively coupled to one or more networks 206. The end user devices 202A and 202B are collectively referred to as user devices 202.

The user device 202A may be general-purpose computer, e.g., a desktop, laptop, etc. The user device 202B may be a portable communications device, such as a smart phone, tablet, personal digital assistant, etc. In an embodiment, each of the user devices implements a web browser application. The user devices 202 may represent consumer devices owned and/or operated by one or more individuals. In an embodiment, the user devices 202 represent a respective sender and a recipient of a communication.

The host system computer 208 is a resource that is accessible by the user devices 202 over one or more networks, such as network(s) 206. In an embodiment, the host system computer 208 may be implemented by a social network website or collaborative network website that provides collaborative sharing of media files and content among end users. Alternatively, the host system computer 208 may be implemented by a third-party application service provider that hosts or manages content distribution and related services for one or more content provider enterprises.

A storage device 210 is communicatively coupled to the host system computer 208. The storage device 210 stores an application for customized timing for access to shared media files, as well as communications posted and exchanged among end users. The storage device 210 also stores a database of communications, relationship scores, and training data. In an embodiment, the storage device 210 also stores a communications sharing application that is executable by the host system computer 208 to implement the embodiments described herein.

Networks 206 may include a combination of one or more different types of networks (e.g., local area network, wide area network, Internet, satellite, or terrestrial network, to name a few).

Figure 3:
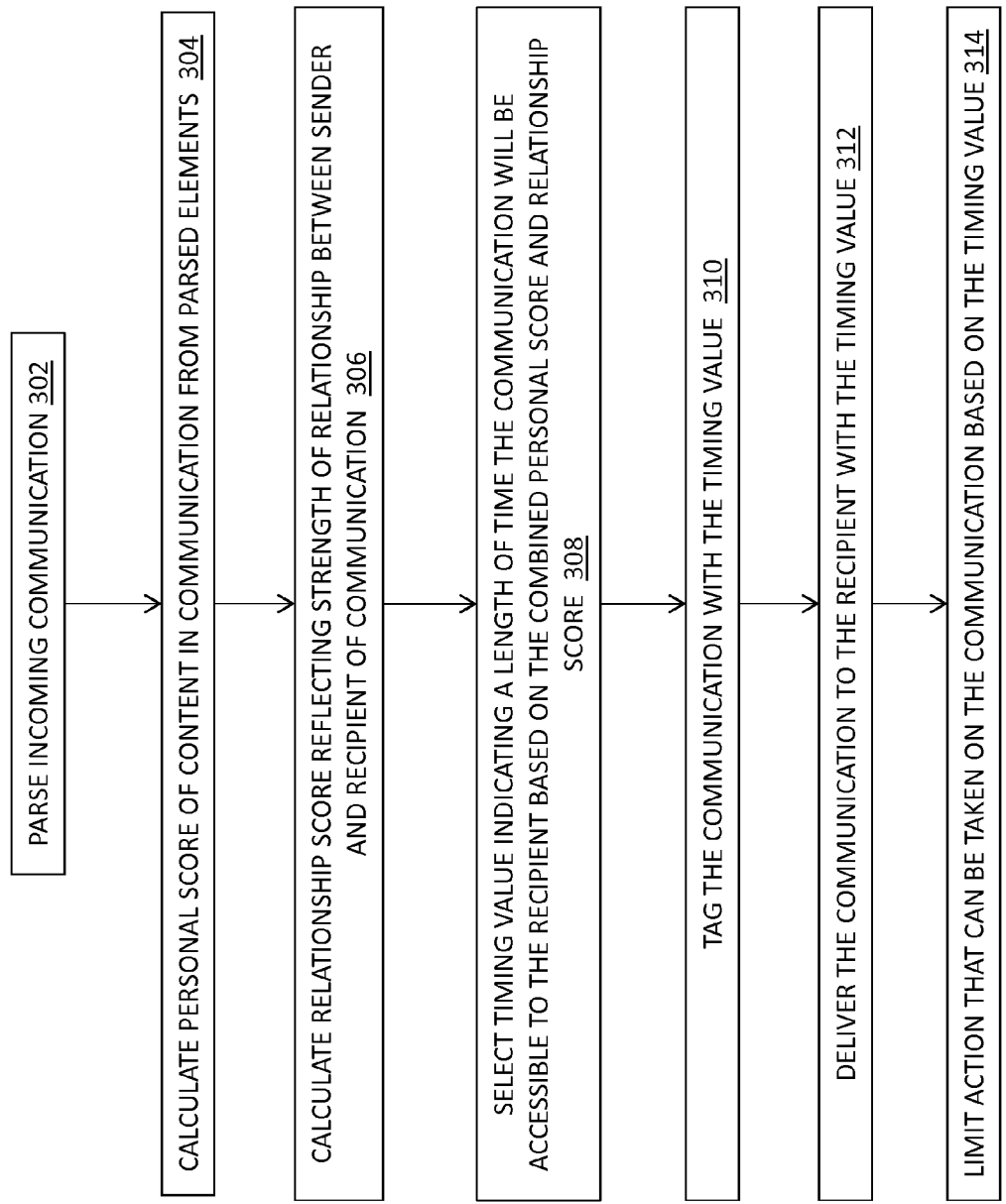
FIG. 3 depicts a flow diagram of a process for implementing customized timing for access to shared media files according to an embodiment of the invention.

Turning now to FIG. 3, a process for implementing the customized timing for access to shared media files will now be described in an embodiment. The process of FIG. 3 assumes that a training data database 107 has been created with corresponding elements and assigned values, as well as criteria for assessing relationship strengths. In an embodiment, a lowest value indicates a least degree of personal association (e.g., emotional response) for a corresponding element (e.g., text, images, multi-media), and a highest value indicates a greatest degree of personal association.

In block 302, a communication that has been initiated by a sender is parsed to identify constituent content elements, such as sender identity, recipient identity, and other elements in the communication, such as a news article, a video, a personal comment, an image, etc.

In block 304, a personal score is calculated from the parsed elements. The personal score indicates a degree of personal association of the content to the sender. In an embodiment, the parsed elements of the communication are compared with the training data elements, and the values of any training data elements that match the parsed elements are aggregated to determine the personal score.

In block 306, a relationship score is calculated that reflects a strength of relationship between the sender and the recipient. As described above, the relationship score is calculated, in part, from a body of previous communications conducted between the sender and the recipient.

In block 308, a timing value is selected that indicates an amount of time the communication will be accessible to the recipient based on the combined personal and relationship scores. The length of time the communication will be accessible to the recipient increases in direct proportion to the increase in the combined personal score and relationship score.

In block 310, the communication is tagged with the timing value and is transmitted to the recipient at block 312. Alternatively, the timing value is not transmitted with the communication but is monitored either by the host system computer 208, e.g., via the communications sharing application, or may be monitored at the recipient's device (e.g., one of the user devices 202), or other desired location in the network.

In block 314, the timing value limits actions that can be taken on the communication by the recipient. The communication is monitored in terms of the amount of time that elapses following delivery of the communication (e.g., timestamp of a post). Alternatively, or in addition, the communication may be monitored in terms of the amount of time that elapses following first access of the communication (e.g., timestamp of access). The timing value may correspond to either of these time points. Alternatively, there may be two separate timing values, each of which is assigned to a corresponding time point.

In an embodiment, the limiting actions that can be taken on the communication by the recipient may include one or more of an ability to open or view the communication, and ability to forward and/or edit the communication. In another embodiment, the timing value may correspond to a time in which the communication is deleted from the host system computer 208.

In one embodiment, the process may be configured to enable user-inputted preferences from the sender of the communication. The user preferences may include a timing value that influences or overrides the timing value assigned based on the combined personal score and relationship score.

Technical effects and benefits include provide customized timing for access to shared media files. The customized timing features enable a variable length timer to be applied to a communication based on the strength of the sender's relationship to the recipient, as well as a degree to which the communication contains personal content. In an embodiment, the timing features prevent or minimize the time a media file is available to another a user for purposes of viewing, copying, or forwarding the file.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    intercepting, by a parser, a communication from a sender to a recipient;
    parsing, by the parser, the intercepted communication; and
    controlling an amount of time that the recipient has access to the communication, the controlling comprising:
        calculating, based on parsed elements of the communication, a personal score for the communication, the personal score indicating a degree to which information in the communication is determined to be of a personal nature, the personal score based at least in part on whether the information in the communication comprises a personal address of the sender or a telephone number of the sender;
        calculating a relationship score reflecting a strength of a relationship between the sender and the recipient, the relationship score calculated from previous communications conducted between the sender and the recipient including a frequency of communications between the sender and the recipient and a proximity in time among communications between the sender and the recipient;
        selecting a timing value indicating a length of time the communication will be accessible to the recipient based on a combined respective personal score and relationship score;
        transmitting the communication to the recipient and monitoring the timing value; and
        limiting actions that can be taken on the communication by the recipient as a function of the timing value, the limiting including controlling the length of time that the recipient has access to the communication, wherein the length of time increases in direct proportion to increases in the combined personal score and relationship score.

2. The method of claim 1, wherein calculating the personal score includes applying the parsed elements to training data, the training data including values assigned to each constituent element of the training data, each of the elements in the training data is predetermined to invoke an emotional response in a corresponding sender upon exposure of the element to external entities, and each of the values reflects a degree to which associated elements of the training data are predetermined to invoke the emotional response;
    wherein the parsed elements of the communication are compared with the constituent elements in the training data to determine the corresponding values, and the corresponding values are aggregated to form the personal score.

3. The method of claim 2, wherein the elements of the training data determined to have a highest value further include at least one of the personal address of the sender, the telephone number of the sender, and a negative sentiment concerning a family member or friend.

4. The method of claim 1, wherein the strength of relationship is further calculated based at least in part on one or both of:
    a type of relationship between the sender and recipient; and
    a previously calculated personal scores from communications conducted between the sender and the recipient.

5. The method of claim 1, further comprising receiving user preferences from the sender of the communication, the user preferences including a second timing value that influences or overrides the timing value assigned from the combined personal score and relationship score.

6. The method of claim 1, wherein the monitoring the timing value includes monitoring at least one of an amount of time lapsing following delivery of the communication and an amount of time lapsing following access of the communication by the recipient.

7. The method of claim 1, wherein the limiting actions that can be taken on the communication by the recipient based on the timing value includes limiting an ability of the recipient to open, forward, and edit the communication.

8. The method of claim 1, wherein the communication is deleted upon expiration of a time period indicated in the timing value.

9. A system, comprising:
a memory having computer readable instructions; and
a processing unit for executing the computer readable instructions, the computer readable instructions including:
  intercepting, by a parser, a communication from a sender to a recipient;
  parsing, by the parser, the intercepted communication; and
  controlling an amount of time that the recipient has access to the communication, the controlling comprising:
    calculating, based on parsed elements of the communication, a personal score for the communication, the personal score indicating a degree to which information in the communication is determined to be of a personal nature, the personal score based at least in part on whether the information in the communication comprises a personal address of the sender or a telephone number of the sender;
    calculating a relationship score reflecting a strength of a relationship between the sender and the recipient, the relationship score calculated from previous communications conducted between the sender and the recipient including a frequency of communications between the sender and the recipient and a proximity in time among communications between the sender and the recipient;
    selecting a timing value indicating a length of time the communication will be accessible to the recipient based on a combined respective personal score and relationship score;
    transmitting the communication to the recipient and monitoring the timing value; and
    limiting actions that can be taken on the communication by the recipient as a function of the timing value, the limiting including controlling the length of time that the recipient has access to the communication, wherein the length of time increases in direct proportion to increases in the combined personal score and relationship score.

10. The system of claim 9, wherein calculating the personal score includes applying the parsed elements to training data, the training data including values assigned to each constituent element of the training data, each of the elements in the training data is predetermined to invoke an emotional response in a corresponding sender upon exposure of the element to external entities, and each of the values reflects a degree to which associated elements of the training data are predetermined to invoke the emotional response;
  wherein the parsed elements of the communication are compared with the constituent elements in the training data to determine the corresponding values, and the corresponding values are aggregated to form the personal score.

11. The system of claim 10, wherein the elements of the training data determined to have a highest value include at least one of the personal address of the sender, the telephone number of the sender, and a negative sentiment concerning a family member or friend.

12. The system of claim 9, wherein the strength of relationship is further calculated based at least in part on one or both of:
  a type of relationship between the sender and recipient; and
  a previously calculated personal scores from communications conducted between the sender and the recipient.

13. The system of claim 9, wherein the computer readable instructions further comprise receiving user preferences from the sender of the communication, the user preferences including a second timing value that influences or overrides the timing value assigned from the combined personal score and relationship score.

14. The system of claim 9, wherein the monitoring the timing value includes monitoring at least one of an amount of time lapsing following delivery of the communication and an amount of time lapsing following access of the communication by the recipient.

15. The system of claim 9, wherein the limiting actions that can be taken on the communication by the recipient based on the timing value includes limiting an ability of the recipient to open, forward, and edit the communication.

16. The system of claim 9, wherein the communication is deleted upon expiration of a time period indicated in the timing value.

17. A computer program product comprising a computer readable storage medium having program instructions embodied therewith, wherein the computer readable storage medium is not a transitory signal per se, the program instructions executable by a computer processor to cause the computer processor to perform a method comprising:
  intercepting, by a parser, a communication from a sender to a recipient;
  parsing, by the parser, the intercepted communication; and
  controlling an amount of time that the recipient has access to the communication, the controlling comprising:
    calculating, based on parsed elements of the communication, a personal score for the communication, the personal score indicating a degree to which information in the communication is determined to be of a personal nature, the personal score based at least in part on whether the information in the communication comprises a personal address of the sender or a telephone number of the sender;
    calculating a relationship score reflecting a strength of a relationship between the sender and the recipient, the relationship score calculated from previous communications conducted between the sender and the recipient including a frequency of communications between the sender and the recipient and a proximity in time among communications between the sender and the recipient;
    selecting a timing value indicating a length of time the communication will be accessible to the recipient based on a combined respective personal score and relationship score;
    transmitting the communication to the recipient and monitoring the timing value; and
    limiting actions that can be taken on the communication by the recipient as a function of the timing value, the limiting including controlling the length of time that the recipient has access to the communication, wherein the length of time increases in direct proportion to increases in the combined personal score and relationship score.

18. The computer program product of claim 17, wherein calculating the personal score includes applying the parsed elements to training data, the training data including values assigned to each constituent element of the training data, each of the elements in the training data is predetermined to invoke an emotional response in a corresponding sender upon exposure of the element to external entities, and each of the values reflects a degree to which associated elements of the training data are predetermined to invoke the emotional response;

wherein the parsed elements of the communication are compared with the constituent elements in the training data to determine the corresponding values, and the corresponding values are aggregated to form the personal score.

* * * * *